Feb. 6, 1923.

H. HEMPEL.
CRUDE OIL TANK.
FILED MAY 21, 1919.

WITNESS:

INVENTOR.
Henry Hempel.
BY
George J. Thorpe
ATTORNEY.

Feb. 6, 1923. H. HEMPEL. 1,444,246.
CRUDE OIL TANK.
FILED MAY 21, 1919. 3 SHEETS—SHEET 3.

WITNESS:

INVENTOR.
Henry Hempel.
BY
George Y. Thorpe
ATTORNEY.

Patented Feb. 6, 1923.

1,444,246

UNITED STATES PATENT OFFICE.

HENRY HEMPEL, OF GAGE, OKLAHOMA.

CRUDE-OIL TANK.

Application filed May 21, 1919. Serial No. 298,628.

*To all whom it may concern:*

Be it known that I, HENRY HEMPEL, a citizen of the United States, residing at Gage, in the county of Ellis and State of Oklahoma, have invented certain new and useful Improvements in Crude-Oil Tanks, of which the following is a specification.

This invention pertains to crude oil tanks and while not restricted to any particular character of such tanks or service, relates more especially to that class of tanks, known as stock tanks, into which oil direct from the wells is discharged, after passing successively through what is known as "gun barrel" tanks, for the removal of water from the oil, and one or more settling tanks whereby the heaviest constituents of oil are removed in a short time.

It is universal knowledge among oil operators that large quantities of the most valuable part of crude oil are lost by evaporation on account of improper storing and handling before the oil reaches the refinery, and I have found that a large proportion of this loss can be traced in the passage of the oil from the wells to the stock tanks. One common practice at the present time is to heat the oil in the gun barrel tank to facilitate its settling and this heating facilitates evaporation of a percentage of the lighter and more volatile constituents of the oil. There is also the custom of heating the oil in the settling tank and this likewise induces evaporation and loss of a percentage of the most valuable constituents of the oil. The object of my invention is to produce a tank wherein provision is made for trapping the heavier constituents of the oil after the same has passed through the "gun barrel" tank and the settling tank, if desired, and preferably without subjecting the oil to heat in either, and isolating such trapped constituents from the body of the oil, and for effecting the independent removal from the tank of either the body of oil or the trapped heavy oil, as desired.

Another object is to provide means for giving direct access to the trapped oil for determining the depth thereof in the tank. Another object is to provide means for washing or scouring the trap with a liquid cleansing agent. A still further object is to produce a construction whereby an attendant may enter the trap when the tank is empty.

With these general objects in view the invention consists in certain novel and useful features of parts as hereinafter described and claimed; and in order that it may be fully understood reference is to be had to the accompanying drawings, in which:

Figure 1:
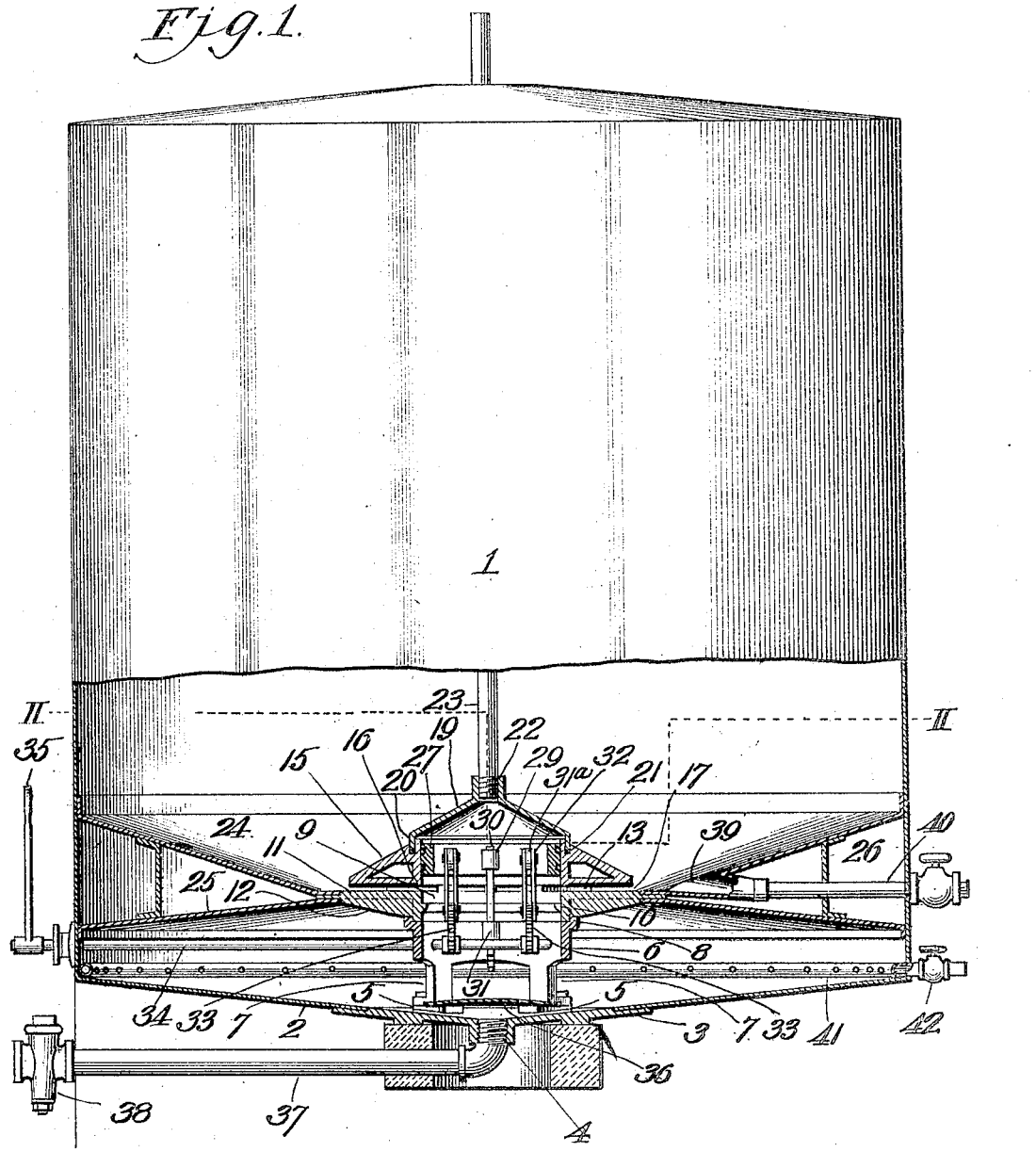
Figure 1, is a view partly in side elevation and partly in central vertical section, of an oil tank embodying the invention.
Figure 2:
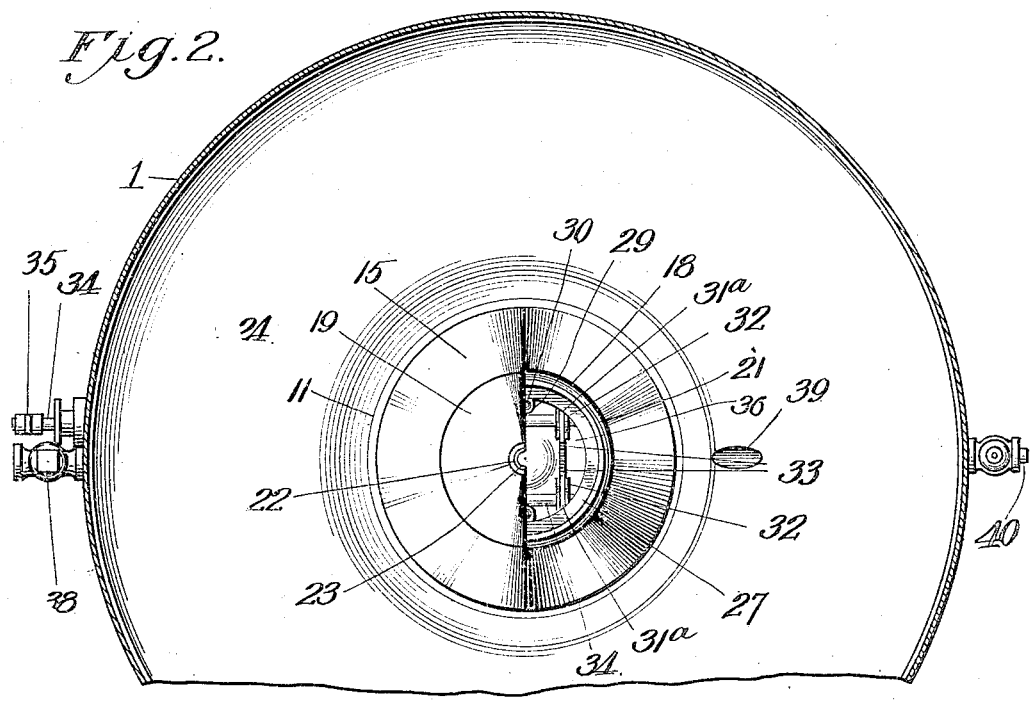
Figure 2, is a horizontal section on the irregular line II—II of Figure 1.
Figure 3:
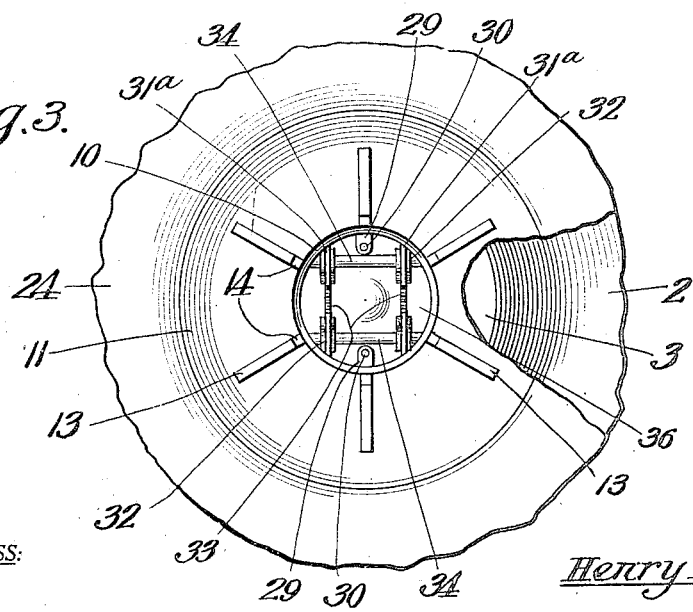
Figure 3, is a horizontal section on the line III—III of Figure 5.
Figure 4:
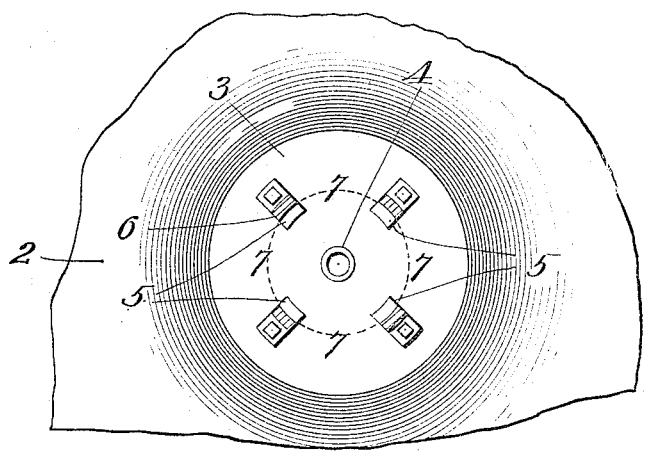
Figure 4, is a horizontal section on the line IV—IV of Figure 5.
Figure 5:
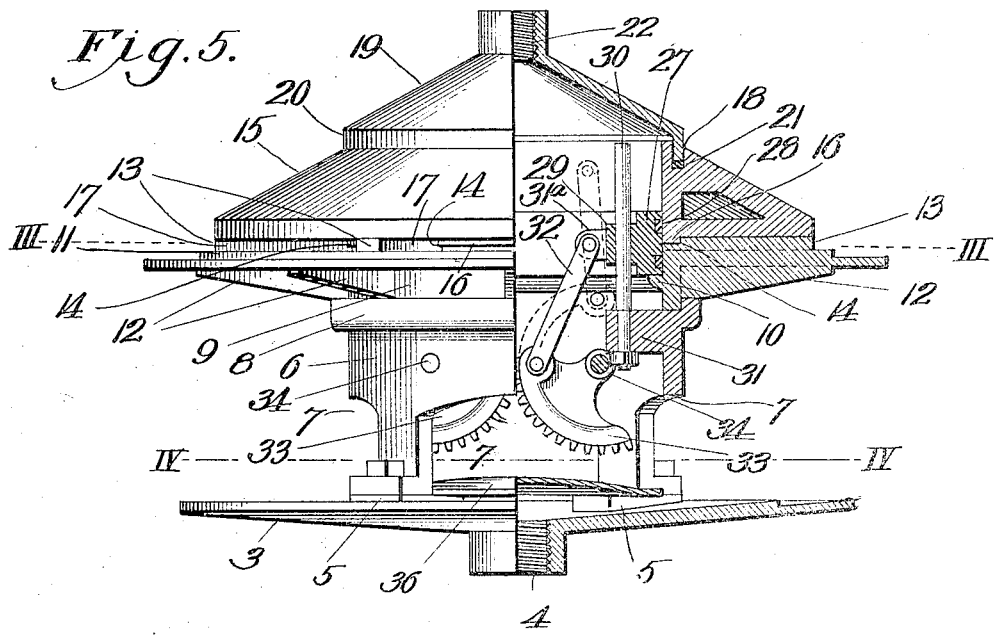
Figure 5, is a detailed view partly in side elevation and partly in central vertical section of the dome element of the tank; said figure being taken at right angles to the view of the dome disclosed by Figure 1 and on a larger scale.

Referring to the drawings in detail, 1 indicates a tank of any suitable or preferred construction; the bottom 2 sloping downwardly and inwardly, and at its central portion preferably consisting of a cast section 3 having a central discharge opening 4, said section 3 being provided with a series of upwardly projecting lugs 5 to form supports for a dome constructed as follows:

A vertical cylindrical member 6 is formed in its lower end with a series of openings 7, and between the same stands upon and is bolted to the lugs 5. Said member is provided at its upper margin with an enlargement 8 receiving a superposed member 9, and interlocking the two members together as regards lateral movement thereof, and said member 9 is provided with an inwardly projecting shoulder 10 as a stop for a part hereinafter mentioned, and is also provided at its upper margin with an outwardly projecting flange 11 and with stiffening ribs or braces 12 for said flange. The flange is provided with upwardly projecting radial ribs 13 provided with recesses 14 in their inner ends.

Superposed to member 9 is a frustum shaped member 15 for resting upon said ribs 13, and said frustum shaped member is provided with a depending flange 16 engaging the recesses 14 of said ribs for the purpose of interlocking said member 9 and 15 together as regards lateral movement, the said ribs 13 spacing the said members apart to provide a series of ports 17 leading from above the flange 11 to the interior of the dome.

The frustum shaped member is provided in its upper edge with a groove 18, and above said member is a conical cap or member 19 having a marginal flange 20 engaging groove 18 and a gasket 21 within said groove, the gasket serving to establish a liquid tight joint between the frustum shaped and cap members, and the latter is provided at its upper end or apex with a threaded opening 22 for engagement with the threaded lower end of a vertical tube 23 extending through and projecting from the top of the tank as a vent and for another purpose hereinafter mentioned.

24 is a downwardly tapering partition ring secured at its upper edge to the wall of the tank and at its lower edge to the outer edge of the flange 11, which partition ring in conjunction with the dome constitutes a ported false bottom for the tank, and in order to brace the said false bottom and aid in securing the dome in position, an upwardly and inwardly tapering partition ring 25 is secured at its outer margin to the tank and at its inner margin to said flange 11, this partition ring constituting if imperforate as shown, the top of the trap or chamber lying between the real and false bottoms of the tank, it being noted that it may be desirable to additionally brace the false bottom by the use of bracing brackets or standards 26, secured to the partition ring 25 at their lower ends and to the false bottom or partition ring 24 at their upper ends. With the construction as shown it is obvious that oil introduced within the tank is free to pass through the ports 17 into the dome and thence through openings 7 into the trap. As it is desirable at times to cut off this communication between the interior of the tank above the false bottom and the underlying trap, a ring valve 27 fits snugly in the dome and normally stands within the frustum shaped member thereof, the said valve being preferably provided with packing rings 28 like a piston for engaging the wall of the dome with a fluid tight relation. This valve is adapted to be lowered at times so as to close the inner ends of the ports 17, the shoulder 10 limiting downward movement of the valve, as indicated by Figue 5. To guide the valve in its upward and downward movement, it is provided with a pair of inwardly projecting lugs 29 engaging vertical guide rods 30 secured to inwardly projecting lugs 31 of member 6 of the dome. To impart upward and downward movement to the valve, it is provided with ears 31ª pivotally connected by links 32 to intermeshing gear wheel segments 33 secured upon a pair of parallel shafts 34 journaled in the member 6, one of said shafts extending out through the wall of the tank and being equipped with a handle 35 whereby both sets of segment gears may be simultaneously operated for the purpose of imparting upward or downward movement as the case may be to the valve, it being noticed in this connection, that the valve operating mechanism leaves the center of the dome unobstructed, in order that a testing device inserted through the tube 23, may be arrested by a depth plate 36 fitting within the member 6 of the dome and resting upon the lugs 5 of the bottom of the tank. The testing device (not shown) is merely a rod upon which may be gathered a coat of heavy oil extending from the bottom of the rod at the depth plate to the level of the surface of such oil in the dome, to show approximately the quantity of such oil if it stands to a depth as high or higher than the level of ports 17. It will be noticed that the weight of the valve tends to hold it open, as the lines of the pivotal points of links 32 stand slightly off center with respect to the axes of shafts 34. It will be understood that the depth plate by resting on the lugs 5 is spaced from the tapering bottom and hence does not interfere with the flow of oil to the discharge opening 4 of the bottom, and thence through a discharge pipe 37 connected to said opening 4 and provided with a controlling valve 38 at an accessible point.

For drawing off oil from the tank above the false bottom the latter is provided at its lowest point with an opening 39 with which communicates a valve-controlled discharge pipe 40.

When a tank of this character is charged with oil it is free to flow into the trap through the ports 17, and if left to settle for a short period as is customary, heavy constituents of the oil will enter the trap. When the oil stands a sufficient length of time for this settling of its heavy constituents to occur, oil from above the false bottom can be drawn off by opening the valve of pipe 40, in fact all of the oil from above the false bottom may be drawn off if desired without disturbing the oil in the trap. If the oil is of good quality, the tank may be filled and emptied above the trap a number of times before a sufficient volume of the heavy oil has been trapped to make it advisable to withdraw such heavy oil from the trap. When this time occurs the operator, if the tank contains oil above the false bottom, will operate lever 35 to close the valve 27. The valve 38 is then opened to permit the heavy oil to drain from the trap, all of the oil being free to escape because it can flow to the discharge opening 4 between the lugs 5 and under the depth plate 36. When the valve 27 is closed, oil may be drawn off from both chambers of the tank at the same time, and of course oil may be drawn from either chamber at will.

Tanks of this character are usually made of steel plates bolted together with a liquid tight relation, but for convenience of illustration such construction is not indicated.

It may be desirable at times to wash or scour the bottom of the trap, and for the easier accomplishment of this purpose a perforated spray pipe 41 is secured in the trap and is controlled by a valve 42. Water or any other liquid or solution under pressure or otherwise may be introduced and discharged within the tank, and drained from the latter through the pipe 37.

If it becomes advisable at any time to scrape the interior of the trap for the more effective cleaning thereof, it can be done after the tank is emptied, by lifting the frustum shaped and cap members from position. A workman may then have access to the trap through the ring valve or an opening 7.

From the above description it will be apparent that I have produced a crude oil tank which possesses all of the advantage pointed out, and while I have illustrated the preferred embodiment of the same I reserve the right to all changes falling within the principle of construction involved.

I claim:

1. An oil tank provided with a bottom and having a false bottom comprising a partition and a dome, the latter communicating with the chamber below the false bottom and having ports communicating with the tank above the false bottom, a depth plate on the real bottom, a tube extending from said dome up through the tank in alinement with said depth plate, a valve for closing communication between the interior of the tank and the dome at a point above the false bottom, and independent means for drawing off oil from above and below the false bottom.

2. An oil tank, having a dome rising from the bottom thereof, a false bottom for said tank through which the dome projects; said false bottom having its outer edge secured to the wall of the tank and its inner edge secured to said dome, the latter having a series of ports establishing communication between the interior of the tank above said false bottom and the interior of the dome, a valve for closing said ports, a depth plate on the real bottom of the tank within said dome, a tube extending vertically from said dome in line with said plate, and independent means for withdrawing oil from the tank above and below said false bottom.

3. An oil tank, having a dome rising from the bottom thereof, a false bottom for said tank through which the dome projects; said false bottom tapering downwardly and inwardly and having its upper edge secured to the wall of the tank and its lower edge secured to said dome; said dome having a series of ports above said false bottom for establishing communication between the interior of the dome and the tank above said false bottom, an annular valve within said dome, means for operating said valve to close or open communication between the interior of the tank above the false bottom and the interior of the dome, independent means for withdrawing the contents of the tank above and below the false bottom thereof, a depth plate on the real bottom of the tank within said dome a tube extending vertically from said dome, in line with said plate.

4. An oil tank having a downwardly tapering bottom and a discharge opening at the lowest point of said bottom, a dome mounted upon said bottom around said opening and provided with openings in the lower part of its wall and with a series of ports in a plane above that occupied by said openings, the dome above said ports tapering upwardly, a downwardly and inwardly tapering false bottom secured at its upper edge to the wall of the tank and at its lower edge to said dome in a plane below the ports thereof but above the openings, an annular valve fitting snugly in the dome, and manually operable means for imparting vertical movement to said valve to effect the closure of said ports.

5. An oil tank, having a downwardly tapering bottom and a discharge opening at the lowest point of said bottom, a dome mounted upon said bottom around said opening and provided with openings in the lower part of its wall and with a series of ports in a plane above that occupied by said openings, the dome above said ports tapering upwardly, a downwardly and inwardly tapering false bottom secured at its upper edge to the wall of the tank and at its lower edge to said dome in a plane between the openings and portions thereof, an upwardly and inwardly extending partition secured to the wall of the tank and to said dome and the downwardly and inwardly sloping false bottom, an annular valve fitting snugly in the dome, and manually operable means for imparting vertical movement to said valve to effect the closure of said ports.

6. An oil tank having a downwardly tapering bottom and a discharge opening at the lowest point of said bottom, a dome mounted upon said bottom around said opening and provided with openings in the lower part of its wall and with a series of ports in a plane above that occupied by the said openings, the dome above the said ports tapering upwardly, a downwardly and inwardly tapering false bottom secured at its upper edge to the wall of the tank and at its lower edge to said dome in the plane of the lower margins of said ports, an annular valve within the dome, a plurality of vertical guides for said valve, two pairs of intergeared sectors within the dome, links pivotally connecting said sectors with the valve, and an operating shaft suitably journaled in the lower part of the tank and in the wall of the dome and rigidly carrying one of each of said pairs of sectors.

7. An oil tank having a dome rising from the bottom thereof, and comprising a lower portion having openings, an intermediate portion upon the lower portion and interlocked therewith against lateral movement and provided with an outwardly projecting flange, a partition extending inwardly and upwardly from the wall of the tank to said flange and fastened to the latter and to the wall of the tank, radial ribs upon said flange, a conical member resting upon said ribs and interlocked therewith as regards lateral movement and spaced by said ribs from said flange to provide intervening spaces or ports, a conical cap fitting with a liquid tight joint upon said conical member and covering the interior of the dome, a downwardly and inwardly tapering false bottom secured at its upper edge to the wall of the tank and at its lower edge to the outer margin of said flange, a valve-controlled pipe communicating with the tank above said false bottom, and a valve-controlled drain pipe connected to the tank below the false bottom.

In testimony whereof I affix my signature.

HENRY HEMPEL.